United States Patent [19]

Workman

[11] Patent Number: 4,537,313

[45] Date of Patent: Aug. 27, 1985

[54] FLEXIBLE INSULATED CONTAINER

[76] Inventor: Eleanor Workman, 545 Ridge Ave., Elk Grove Village, Ill. 60007

[21] Appl. No.: 583,722

[22] Filed: Feb. 27, 1984

[51] Int. Cl.³ .................. H45C 11/20; F25D 3/08; B65D 81/18
[52] U.S. Cl. ..................... 206/545; 62/372; 62/457; 383/110; 206/549
[58] Field of Search .............. 206/545, 549, 541; 383/113, 110; 62/372, 457; 150/52 J, 52 R; 215/13 R

[56] References Cited

U.S. PATENT DOCUMENTS

| | | | |
|---|---|---|---|
| 2,123,031 | 7/1938 | Weiner | 206/545 |
| 2,289,254 | 7/1942 | Eagles | 383/110 |
| 2,960,136 | 11/1960 | Ziff | 383/110 |
| 3,066,847 | 12/1962 | Fortune | 383/110 |
| 3,292,748 | 12/1966 | Rifkin | 383/110 |
| 3,428,103 | 2/1969 | Walsh | 383/110 |
| 3,589,971 | 6/1971 | Reed | 150/52 R |
| 3,637,000 | 1/1972 | Walger et al. | 383/110 |
| 3,906,129 | 9/1975 | Damois | 150/52 R |
| 4,050,264 | 9/1977 | Tanaka | 62/457 |
| 4,196,817 | 4/1980 | Moser | 215/13 R |
| 4,211,091 | 7/1980 | Campbell | 62/372 |
| 4,211,267 | 7/1980 | Skovgaard | 383/110 |

Primary Examiner—William T. Dixson, Jr.
Attorney, Agent, or Firm—Welsh & Katz, Ltd.

[57] ABSTRACT

There is provided an insulated bag of a multi-layer construction employing nylon fabric as inner and outer liners, thermal suede as thermal insulation inside the outer liner, needle punched Dacron fabric as a vapor and thermal barrier, aluminum foil as a thermal barrier and metalized Mylar as a vapor barrier.

8 Claims, 2 Drawing Figures

FLEXIBLE INSULATED CONTAINER

BACKGROUND OF THE INVENTION

This invention relates generally to flexible and portable carrying cases or bags of an insulated type designed to keep the contents thereof at a temperature considerably above or below the ambient temperature. More particularly this invention relates to multi-layer bags comprised of sheets of material of insulating and barrier producing properties.

Prior containers have generally used foam rubber or plastic as an insulating material and relied solely thereon for the insulating properties. Unlike prior containers, the present invention comprises a unique lay-up of sheets to form a soft foldable container having insulating properties far exceeding that accomplished with usual foam insulation.

SUMMARY OF THE INVENTION

Generally there is provided a container in the form of a carrying case having paired sidewalls, normally assuming an upright position, a bottom portion, and a top portion having a sealable opening therein. Each side, including the top and the bottom, are generally composed of a multi-layer configuration having as an inner, inside layer, a fabric composed of either a polyester and cotton blend or nylon, and overlayed by a sheet of metalized Mylar punched with polyester. This sheet is similarly overlayed on its outer side by a sheet of aluminum foil, which is again overlayed on its outer side with a sheet of needle punched Dacron. An insulating layer of thermal suede is layed against the outer side of the Dacron and an outer durable layer is provided in the form of nylon or polyester/cotton. When formed into a bag, as described herein, whether for a convenient lunch bag, carrying case, or a specialty designed bag for carrying pizzas or wine bottles, the insulating capability is exceptional.

Objects and advantages of the invention will become apparent upon reading the following detailed description and upon reference to the drawings, in which.

While the invention will be described in connection with the preferred embodiment, it will be understood that I do not intend to limit the invention to that embodiment. On the contrary, I intend to cover all alternatives, modifications and equivalents as may be included within the spirit and scope of the invention as defined by the appended claims.

DESCRIPTION OF THE PREFERRED EMBODIMENT

Figure 1:
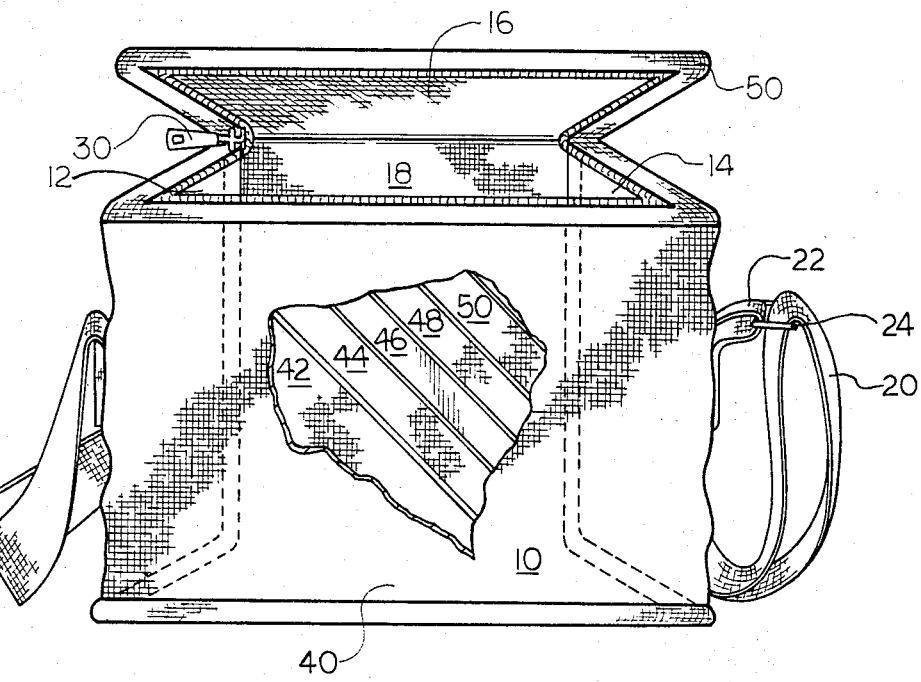
FIG. 1 is a front elevational view, in perspective, showing a preferred embodiment of the present invention with the front panel thereof partially cut away showing the multiple layers therein.
Figure 2:
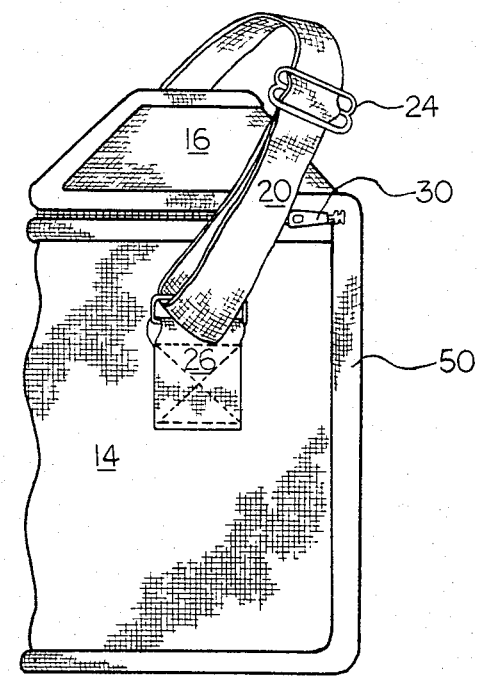
FIG. 2 is a side elevational view of the bag of the preferred embodiment.

Turning first to FIG. 1, there is shown a front elevational and perspective view of the preferred embodiment of the present invention showing a portable, soft, insulated bag composed of a front panel 10, side panels 12 and 14, a top opening panel 16, back panel 18 and a bottom panel not shown. Attached to the side panels is a carrying strap 20 affixed to a fabric loop 22 by a ring device 24. This fabric loop is generally stitched or otherwise attached to the side panel 14 at its attachment extensions 26 (see FIG. 2).

For closing of the bag there is provided in the preferred embodiment of the present invention a zipper 30 which traverses the periphery of the top panel.

Turning now to the cut away portion of FIG. 1, it can be seen that the outer layer 40 is shown encompassing the entire exterior of the bag, whether top, bottom, side, front or back. This material is generally composed of durable nylon or a 50% polyester/50% cotton blend. Inside this outer layer is provided a themal suede insulation layer 42. Inside this insulation layer there is provided an inner layer 44 of needle punched Dacron fabric which applicant believes provides a partial vapor and thermal barrier as well as insulation. Inside this layer there is provided an aluminum foil layer 46 for providing additional vapor and thermal barriers. Inside of the foil layer there is provided a vapor barrier layer of metalized Mylar punched with polyester 48; and lastly, there is provided a durable inner layer 50 for the inside of the bag. All these layers are of a flexible, pliable material and provide in combination an extremely soft carrying case with exceptional insulation properties.

Keeping the bag in shape is a periphery binding 60 traversing three sides of the periphery of the top, three sides of the periphery of each side, and three sides of the periphery of the bottom. With this pattern the bag can be folded flat when not in use and easily expanded to full size when needed.

With the current choice of materials and construction of the bag is as follows. First, a layer of nylon is cut pursuant to pattern to form the inside and the outside fabrics. Next, the internal barrier and insulation layers are cut pursuant to pattern and all cut fabrics are stacked for assembly. At this point of assembly, the six separate pieces are temporarily attached one to each other for handling. The zipper is then attached, one half to the front and sides of the bag and one half to the back and top of the bag. The straps are then cut and sewn to the sides of the bag. Finally, starting from the left side of the bag the two pieces; the front and side, and the back with top and bottom; are placed one on top of the other and are sewn together. A finishing step is attaching a nylon binding material around the designed seam to provide finishing and structural stiffening.

The superiority of the capabilities of this bag has been proven by laboratory tests performed by The Robert W. Hunt Company, 810 South Clinton, Chicago, Ill. 60607 on Feb. 10, 1984.

Temperature Change Test Description

Each sample was placed in a constant temperature/humidity chamber for a specified time period. A 500 ml beaker was placed in each sample and the beaker was filled with 500 ml of $H_2O$. The temperatures of the $H_2O$ were approximately 72° C. and 4° C. for the respective hot and cold temperature change tests. Another 500 ml beaker was filled with 500 ml of the same temperature $H_2O$ as that contained in the test specimen and placed on the work bench beside the test specimens. This beaker acted as a control to monitor chamber temperatures throughout the test period. A thermocouple connected to the Daystrom/Weston strip chart recorder was placed in each beaker. The bag was closed and the recorder was activated.

Test results are as follows:

| TIME (Hours) | Sample Placed in Small Bag °C. #3 | Sample open in Chamber Room Temp. °C. #7 | Sample Placed in Large Bag °C. #10 |
| --- | --- | --- | --- |
| 0 | 4 | 5 | 4 |
| 1 | 10 | 12 | 10 |
| 2 | 13 | 16 | 14 |
| 3 | 15 | 19 | 16 |
| 4 | 16 | 20 | 18 |
| 5 | 18 | 21 | 19 |
| 6 | 18 | 21 | 20 |
| 7 | 20 | 22 | 21 |
| 8 | 20 | 22 | 21 |
| 9 | 20 | 22 | 21 |
| 10 | 20 | 22 | 21 |
| 11 | 21 | 22 | 22 |
| 12 | 21 | 22 | 22 |
| 13 | 21 | 22 | 22 |
| 14 | 21 | 22 | 22 |
| 15 | 21 | 22 | 22 |
| 0 | 74 | 71 | 73 |
| 1 | 52 | 39 | 51 |
| 2 | 42 | 29 | 40 |
| 3 | 36 | 25 | 35 |
| 4 | 32 | 24 | 31 |
| 5 | 29 | 23 | 29 |
| 6 | 27 | 23 | 27 |
| 7 | 25 | 23 | 27 |
| 8 | 25 | 23 | 27 |
| 9 | 25 | 24 | 26 |
| 10 | 23 | 24 | 24 |
| 11 | 24 | 24 | 25 |
| 12 | 25 | 25 | 25 |
| 13 | 25 | 25 | 26 |
| 14 | 25 | 25 | 25 |

In summary there has been shown and described a multilayer insulated container exhibiting soft foldable properties comprised of inner and outer liners, thermal suede insulation, metalized Mylar as a vapor barrier, aluminum foil as a thermal barrier, and needle punched Dacron fabric.

I claim:

1. An insulated container comprising a bottom panel, a front panel, a back panel and opposed side panels, said front, back and side panels being secured to said bottom panel along marginal edges thereof and being selectively secured to each other so as to lie generally normal to said bottom panel and define therewith a pouch, and a top panel hingedly attached to one of said side panels in a manner to enable selective movement between a closed position closing said pouch and an open position providing access to said pouch, said bottom, front, rear, side and top panels each including an outer exposed durable layer of nylon and an inner layer of metalized mylar, and a composite insulation layer between said outer and inner layers comprising a layer of needle punched dacron, a layer of aluminum foil, a layer of dacron and a layer of thermal suede, said composite insulation layers being of substantially equal planar size to the corresponding inner and outer layers.

2. An insulated container as defined in claim 1 including fastener means operatively associated with the peripheral edge of said top panel and free edges of said front, rear and side panels, and being selectively operable to releasably secure the peripheral edge of said top panel to said free edges so as to fully close said pouch.

3. An insulated container as defined in claim 1 including an elongated strap having opposite ends secured, respectively, to said side panels so as to form a shoulder carrying strap.

4. An insulated container as defined in claim 2 including a nylon binding secured to the peripheral edge of said top panel and along the free edges of said front, rear and side panels so as to lie externally of said fastener means when said top panel is secured to said free edges, said binding being adapted to provide structural stiffening to the corresponding edges of said panels.

5. An insulated container as defined in claim 1 wherein said outer durable layer comprises a polyester-cotton blend material.

6. An insulated container comprising a bottom panel and at least one side panel secured to said bottom panel and defining therewith a selectively closable pouch, said bottom and side panels each including an outer exposed durable layer of nylon and an inner layer of metalized mylar, and a composite insulation layer between said outer and inner layers comprising a layer of needle punched dacron, a layer of aluminum foil, a layer of dacron and a layer of thermal suede, said composite insulation layers being of substantially equal size to the corresponding inner and outer layers.

7. An insulated container as defined in claim 6 including fastener means operatively associated with said side panel and cooperative therewith in a manner to enable selective opening and closing of said pouch.

8. An insulated container as defined in claim 7 including an elongated strap having opposite ends secured to said side panel so as to form a shoulder carrying strap.

* * * * *